US 6,566,470 B2

(12) United States Patent
Kantamneni et al.

(10) Patent No.: US 6,566,470 B2
(45) Date of Patent: May 20, 2003

(54) FLUORINATED POLYMERIC PAPER SIZES AND SOIL-RELEASE AGENTS

(75) Inventors: Shobha Kantamneni, White Plains, NY (US); Franz Dirschl, Augsburg (DE)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/834,773

(22) Filed: Apr. 12, 2001

(65) Prior Publication Data

US 2002/0096286 A1 Jul. 25, 2002

Related U.S. Application Data

(60) Provisional application No. 60/197,844, filed on Apr. 14, 2000.

(51) Int. Cl.$^7$ ............................................. C08F 118/00
(52) U.S. Cl. ................. 526/245; 526/243; 526/255; 526/273; 526/307; 526/307.7; 526/320; 526/328.5; 526/329.2; 526/329.3; 526/329.4; 442/154; 442/155; 442/168; 442/170
(58) Field of Search ..................... 526/243, 245, 526/255, 273, 307, 307.7, 320, 328.5, 329.2, 329.3, 329.4; 442/154, 155, 168, 170

(56) References Cited

U.S. PATENT DOCUMENTS

| 3,919,183 A | | 11/1975 | Jager et al. ............ 260/86.1 R |
| 4,013,627 A | | 3/1977 | Temple ........................ 526/245 |
| 4,100,340 A | | 7/1978 | Waldmann et al. .......... 526/245 |
| 4,127,711 A | * | 11/1978 | Lore et al. ................... 526/245 |
| 4,582,882 A | | 4/1986 | Lynn et al. .................. 526/243 |
| 4,742,140 A | | 5/1988 | Greenwood et al. ........ 526/245 |
| 5,753,569 A | * | 5/1998 | Michels et al. ................ 442/88 |
| 5,919,527 A | | 7/1999 | Fitzgerald et al. ........ 427/389.7 |
| 6,180,740 B1 | * | 1/2001 | Fitzgerald ................... 526/245 |

FOREIGN PATENT DOCUMENTS

| WO | 99/65959 | 12/1999 |

* cited by examiner

Primary Examiner—Helen L. Pezzuto
(74) Attorney, Agent, or Firm—Kevin T. Mansfield

(57) ABSTRACT

Novel fluorine-containing paper sizes which impart oil and grease resistance to paper and soil-release properties to textile products are described which are the copolymerization products of (a) a perfluoroalkyl-substituted (meth)acrylate or (meth)acrylamide, (b) a secondary- or tertiary-amino or quaternary ammonium group-containing (meth)acrylate or (meth)acrylamide, (c) vinylidene chloride and, optionally, d) other copolymerizable nonfluorinated vinyl monomers.

16 Claims, No Drawings

FLUORINATED POLYMERIC PAPER SIZES AND SOIL-RELEASE AGENTS

This application claims the benefit under 35 U.S.C. 119(e) of U.S. Provisional Application No. 60/197,844, filed Apr. 14, 2000.

FIELD OF THE INVENTION

The present invention concerns novel internally or externally applied fluorine containing polymers which impart oil and grease resistance to paper and soil-release properties to textile products. More particularly it concerns copolymerization products of (a) a perfluoroalkyl-substituted (meth)acrylate or (meth)acrylamide, (b) a secondary or, tertiary amino or quaternary ammonium group-containing (meth)acrylate or (meth)acrylamide and (c) vinylidene chloride and, optionally, d) other copolymerizable vinyl monomers, their preparation and use.

BACKGROUND OF THE INVENTION

The use of perfluoroalkyl-substituted compounds to impart oil and grease repellency to textile and paper substrates is along established practice. For paper treatment the most important products have traditionally been phosphate diesters of a perfluoroalkylalkanol or di-perfluoroalkyl-substituted carboxylic acids, as described in U.S. Pat. Nos. 4,485,251, 4,898,981 and 5,491,261. These compounds are applied either in the wet-end—that is they are added to the pulp—or applied by rollers, a size press or other means to the finished paper as a coating. The fluorochemicals used for treating textiles are all polymers; the vast majority are copolymers of poly-perfluoroalkyl (meth)acrylates. More recently such polymers have also been used as external paper sizes since polymers provide the extra benefit of water resistance which is a desirable feature in many food packaging and fast-food applications.

To achieve water repellency by internal sizing, alkyl-ketene-dimer (AKD; sold under the trade name HERCON by Hercules Inc., among others) is most commonly used since the small amount of fluorine add-on (typically 0.08–0.12%) is inadequate for this purpose. In addition, the commonly used internal fluorochemical oil-sizing agents, even while impart oil sizing, have, due to their inherently surfactant-like "head-tail" structure, a deleterious effect on water resistance by inhibiting the AKD curing reaction.

The present invention concerns fluorochemical polymers which are useful as an internally or externally applied oil- and grease proofing paper size which imparts, in addition to oil resistance, excellent water resistance. It has further been discovered that the polymers of the present invention impart excellent soil-release and anti-soiling properties to textiles.

The polymer of the present invention is a copolymer of
a) 45–90% by weight of a perfluoroalkyl-substituted (meth)acrylate or acrylamide,
b) 5–30% by weight of a secondary or tertiary amino or quaternary ammonium group-containing (meth)acrylate or (meth)acrylamide,
c) 1–20% by weight of vinylidene chloride (VDC), and, optionally,
d) 0–10% by weight of a nonfluorinated vinyl monomer.

Relevant prior art includes U.S. Pat. No. 3,919,183 (Jager et al.), which discloses polymers useful as oil repellent coatings for porous substrates such as textile materials and paper which comprise a perfluoroalkylethyl acrylate, optionally copolymerized with up to 95% by weight of other monomers. Among other possible co-monomers, vinylidene chloride and N,N-dialkyl-aminoethyl methacrylate are mentioned. However no vinylidene chloride-containing compositions are exemplified.

U.S. Pat. No. 4,013,627 (Temple) describes textile finishes which are copolymers of 20–99% by weight of a perfluoroalkylethyl acrylate, 1–80% of a vinyl monomer having no non-vinylic fluorine atoms and 0.1–4% of a (meth)acrylate bearing a quarternary ammonium group. Among the possible co-monomers, vinylidene chloride is mentioned but not employed.

U.S. Pat. No. 4,100,340 (Waldmann et al.) describes textile finishes which are copolymers of a perfluoroalkyl-ethyl acrylate, a higher alkyl acrylate, vinylidene chloride and acroylbutylurethane in weight ratios of 1/0.22–0.39/0.45–0.85/0.01–0.14.

U.S. Pat. No. 4,582,882 (Lynn et al.) describes fluorinated paper sizes which are copolymers of 60–80% by weight of a perfluoroalkylalkyl acrylate; 1–30% of a halogenated alkyl or alkoxyalkyl acrylate, 1–15% of glycidyl methacrylate, 1–6% of a (meth)acrylate bearing a quaternary ammonium group and 0–20% vinylidene chloride.

US. Pat. No. 4,742,140 (Greenwood et al.) describes copolymers for use on textiles which comprise 40–75% by weight of a perfluoroalkylethyl acrylate, 10–35% of vinylidene chloride and 10–25% of a $C_2$–$C_{18}$alkyl-(meth)acrylate. An earlier Japanese Patent Application No. 50-54729 (Asahi Glass Co.) discloses similar polymers, but specifies 35–60% of vinylidene chloride and 0.5–5% of N-methylol (meth)acrylamide.

It has now been unexpectedly found that copolymers comprising a perfluoroalkylalkyl (meth)acrylate, a secondary- or tertiary-aminoalkyl(meth)acrylate, vinylidene chloride and up to 10% of copolymerizable nonfluorinated vinyl monomers give superior oil and water resistance to paper products, especially when applied as internal sizes. None of the cited prior art discloses the use of vinylidene chloride and a secondary- or tertiary-aminoalkyl(meth)acrylate as sole comonomers with a perfluoroalkylalkyl (meth)acrylate.

It has further been discovered that the copolymers of the present invention impart excellent soil-release and anti-soiling properties to textile fibers.

DETAILED DISCLOSURE

The present invention concerns compounds which act either as internally or externally applied oil and grease proofing paper sizes or as soil-release agents for textile fibers. The preferred compounds are copolymers comprising monomers copolymerized in the following percentages by weight, relative to the total weight of the copolymers:

a) 45–90% by weight of a monomer of formula $$R_F—W—X—C(=O)—C(R_1)=CH_2 \qquad (1),$$

wherein
$R_F$ is a straight or branched-chain perfluoroalkyl group containing 4 to 20 carbon atoms,
$R_1$ is H or $CH_3$,
X is O, S or $N(R_2)$, wherein $R_2$ is H or an alkyl group with 1 to 4 carbon atoms,
W is alkylene with 1 to 15 carbon atoms, hydroxyalkylene with 3 to 15 carbon atoms,
$—(C_nH_{2n})(O\ C_mH_{2m})_q—$, $—SO_2NR_2—(C_nH_{2n})—$ or $—CONR_2—(C_nH_{2n})—$, wherein n is 1 to 12, m is 2 to 4, q is 1 to 10 and $R_2$ is as defined above;

b) 5–30% by weight of a monomer of formula

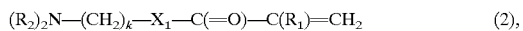

$$(R_2)_2N-(CH_2)_k-X_1-C(=O)-C(R_1)=CH_2 \qquad (2),$$

in which the nitrogen atom is partially or completely quaternized or in the form of a salt and $X_1$, is O or $N(R_2)$ and wherein $R_1$ and $R_2$ are defined as above, each $R_2$ is the same or different, and k is 2 to 4;

c) 1–20% by weight of vinylidene chloride, and, optionally, d) 0–10% by weight of a copolymerizable nonfluorinated vinyl monomer.

Preferably d) is zero.

Especially referred are copolymers in which the monomers are copolymerized in the following percentages by weight, relative to the total weight of the copolymers:

a), 70–85% by weight; b), 3–12% by weight; c), 10–20% by weight, and d), zero.

In preferred copolymers, $R_F$ is a straight chain perfluoroalkyl group with 6–16 carbon atoms, X and $X_1$ are oxygen and W is an alkylene with 1 to 12 carbon atoms, or X is $N(R_2)$, $X_1$ is oxygen and W is $-SO_2NR_2-(C_nH_{2n})-$, wherein $R_2$ and n are as defined above.

The most preferred copolymers are those in which $R_F$ is a straight chain perfluoroalkyl group with 6 to 16 carbon atoms, $R_1$ is hydrogen, X and $X_1$ are oxygen and W is $-CH_2CH_2-$.

A mixture of compounds of the formula (1) with 6 to 16 carbon atoms is advantageously employed to prepare the inventive copolymers. The most especially preferred monomer of the formula (1) to prepare the polymers of this invention is an $R_F$-ethyl acrylate which is available from Clariant Chemical Corp. under the trade name FLOWET AC-812. It has a chain-length distribution of $R_F$-chains of 13±2% $C_6F_{13}$, 48±2% $C_8F_{17}$, 23±2% $C_{10}F_{21}$ and 1.6% $C_{12}F_{25}$ or higher.

Preferred compounds of the formula (2) are N,N-dimethylaminoethyl (meth)acrylate; N,N-diethylaminoethyl (meth)acrylate; N,N-dimethylaminopropyl methacrylamide and N-tert.butylaminoethyl methacrylate and their salts.

Useful as co-monomers (d) are a large number of commercially available acrylates and methacrylates, as well as styrene; but preferably methyl methacrylate, N-methylol acrylamide, 2-hydroxyethyl methacrylate, acrylic acid, glycidyl methacrylate and acrylonitrile.

The polymerization of the monomers to form the copolymers of the invention can be carried out as an emulsion or in solution. For emulsion polymerization water-soluble co-solvents are commonly used to aid migration of the otherwise insoluble $R_F$-monomers through the aqueous phase. Useful co-solvents include acetone and methanol. Suitable free radical initiators include water-soluble peroxides or azo compounds, such as potassium persulfate. In another variation of the polymerization in an aqueous medium, the $R_F$-monomer is first emulsified in water using a surfactant and a homogenizer, followed by copolymerization with the other monomers.

The preferred method for making the polymers of this invention however is solution polymerization. Useful solvents are ketones such as acetone, methyl isobutyl ketone and methyl ethyl ketone, esters such as isopropyl acetate, alcohols such as methanol, ethanol and isopropanol, and aromatic hydrocarbons such as toluene.

The polymerization is typically carried out at temperatures of from about 50 to 100° C. using a free radical initiator, typically a peroxide or azo compound. Useful initiators include benzoyl peroxide, 1,2-azo-bis-isobutyronitrile (AIBN) and 1,2-azo-bis-(2-methylbutane nitrile) (VAZO-67).

A chain-transfer agent can be present, such as an alkyl thiol, in amounts of from 0.01 to 1 mole percent. After the polymerization is complete, the solution is readily transformed into a cationic aqueous emulsion or solution by first adding an organic acid such as acetic acid and water; then distilling off the solvent.

The copolymers are useful as coatings on porous substrates such as paper and textiles, or on hard substrates such as wood, metal or masonry. In the paper industry, their main usefulness is based on their ability to impart oil and grease resistance to paper which is used for food packaging or for any other type of application where resistance to oily substances is required.

Thus the present invention further relates to a method of imparting oil and grease resistance to paper, which comprises incorporating an amount of a copolymer according to this invention that is effective to impart oil and grease resistance into the paper.

The application of the copolymer to paper can either be to the dry paper through a coating process via a size-press (external paper sizing) or by addition of the copolymer to an aqueous pulp (internal paper sizing). The level of application in either case is preferably in the range of 0.02 to 1% by weight of the copolymer, based on the weight of the dry paper or pulp, corresponding roughly to incorporation of 0.01 to 0.5% by weight of fluorine on the paper or pulp.

The usefulness of the copolymers for treating textile materials lies in their ability to impart soil-release characteristics to a fabric during washing, thus facilitating the removal of stains from tablecloths, pants, shirts, etc., thereby extending their useful life, and to enhance the ability of the treated textile material to shed dry soil. The term soil-release denotes the ease with which a fabric, once stained or soiled, can be washed clean. The anti-soiling effect describes resistance to picking up of dry soil and wet soil(=soil redeposition) by the treated textile material. A soil-release finish is usually a fluorochemical hydrophilic polymer, where the fluorochemical segment provides stain repellency and the hydrophilic segment provides wettability and washability.

Suitable textile materials include cellulosics, especially cotton, polyamides such as nylon, wool and silk, polyesters and polyolefins and blends thereof such as polyester-cotton blends.

Thus the present invention further relates to a method to impart soil-release and anti-soiling characteristics to a textile material, which comprises treating the textile material with an amount of a copolymer according to this invention that is effective to impart soil-release and anti-soiling characteristics thereto.

The preferred amounts of the copolymer to treat the textile material with are the same as for paper or pulp.

The present invention further relates to textile material or paper or pulp which contains 0.02 to 1% by weight of a copolymer according to claim 1 therein.

The following non-limiting examples disclose how to synthesize the inventive copolymers and describe in detail methods of their application to various substrates. They also demonstrate the good performance of the copolymers on the various substrates.

EXAMPLE 1

An autoclave fitted with a magnetic coupled agitator is charged with 240.0 g of a perfluoroalkyl-ethyl acrylate with a homologue distribution of $R_F$-chains of 13±2% $C_6F_{13}$, 48±2% $C_8F_{17}$, 23±2% $C_{10}F_{21}$ and 1.6% $C_{12}F_{25}$ or higher (FLOWET AC 812 from Clariant); 40.0 g of N,N-dimethylaminoethyl acrylate (DMEA) and 200.0 g of methyl isobutyl ketone. The autoclave is subjected to reduced pressure and released with nitrogen. To the autoclave 15.0 g of vinylidene chloride and 0.8 g of azobisisobutyronitrile are charged. The polymerization is performed at 66° C. for 20 hours, during which the pressure goes to 0.2 bar. To the polymerization mixture at 60° C. a mixture of water (450.0 g) and acetic acid (30.0 g) is added. This is stirred for 15 min. The polymerization mixture is collected into a roundbottomed flask and methyl isobutyl ketone is removed under vacuum to give 580.0 g of copolymer solution.

EXAMPLES 2 TO 7

The procedure of Example 1 is used to prepare Examples 2 to 6, using the comonomer weight ratios listed below.

The copolymer of Example 2 precipitated out in water and acetic acid due to the reduced amount of N,N-dimethylaminoethylacrylate.

| | Composition of Copolymers, in weight percent | | | |
|---|---|---|---|---|
| EXAMPLE | $R_F$-monomer | Amino (meth)-acrylate | Vinylidene Chloride | Other |
| 1 | 81 | 14 DMEA | 5 | — |
| 2 | 80 | 10 DMEA | 10 | — |
| 3 | 75.5 | 14 DMEA | 10.5 | — |
| 4 | 81.4 | 6.8 DMEA | 5.1 | 6.8 DMPM |
| 5 | 81 | 14 DMEM | 5 | — |
| 6 | 81 | 13 DMEA | 5 | 1 HEMA |
| 7 | 81 | 14 DEEM | 5 | — |

DMEA = dimethylaminoethyl acrylate
DMEM = dimethylaminoethyl methacrylate
DEEM = diethylaminoethyl methacrylate
DMPM = dimethylaminopropyl methacrylate
HEMA = 2-hydroxyethyl methacrylate.

EXAMPLE 8

The procedure of Example 1 is repeated, using 2.4 g n-dodecyl mercaptan as chain-transfer agent.

The following examples describe the synthesis of comparative polymers without VDC.

EXAMPLE 9

A flask fitted with a reflux condenser and stirrer is charged with 20.0 g perfluoroalkylethyl acrylate with a homologue distribution of $R_F$-chains of 13±2% $C_6F_{13}$, 48±2% $C_8F_{17}$, 23±2% $C_{10}F_{21}$ and 1.6% $C_{12}F_{25}$ or higher (FLOWET AC 812 from Clariant); 2.5 g of N,N-diethylamino-ethyl methacrylate; 1.0 g of N,N dimethylacrylamide and 15.0 g of methyl isobutyl ketone. The charge is purged with nitrogen at 40° C. To the flask 0.04 g of azobisisobutyronitrile is added. The polymerization mixture is held between 60 and 65° C. for 20 hours. To the polymerization mixture another 0.03 g of azobisisobuyronitrile is added. The mixture is stirred at 65° C. for an additional 3 hours. To the polymerization mixture at 60° C. a mixture of water (100.0 g) and acetic acid (1.4 g) is added. This mixture is stirred for 15 minutes. The polymerization mixture is collected into a round bottom flask and methyl isobutyl ketone is removed under vacuum to give 120.0 g of copolymer solution (20% solids).

EXAMPLES 10–12

Following the procedure of example 9, polymers with the compositions listed. in the following table were synthesized.

| | Composition of Copolymers, in weight % | | |
|---|---|---|---|
| EXAMPLE | Flowet 812 | Amino (meth)acrylate | Other |
| 9 | 85 | 11 DEEM | 4 DMA |
| 10 | 78 | 13 DEEM | 7 MMA<br>2 GMA |
| 11 | 83 | 15 DEEM | 2 GMA |
| 12 | 83.5 | 14.5 t-BEM | 2 GMA |

DEEM = diethylaminoethyl methacrylate
DMA = N,N-dimethylacrylamide
GMA = glycidyl methacrylate
t-BEM = t-butylaminoethyl methacrylate.

The following example shows the performance of the novel $R_F$-polymers as internal paper sizes.

EXAMPLE 13

The compounds of Examples 1–12 were tested as described below.

Internal Size Application and Testing

Paper plates of 10 inch diameter were made on a small scale paper plate-making machine, supplied by the CHINET Company. This machine consists of a rotating element bearing three radially attached dies, one called the "forming die" which in step 1 is immersed in the pulp and through which the pulp is filtered onto the plate by vacuum; after a ¼ revolution the plate reaches step 2, a die called the "vacuum die" which molds and dries the plate by suction and heat, and in two more ¼ revolutions reaches two more cross-head dies which further dry the plate by heat. The final dryness of the plate is influenced by the strength of the vacuum and the drainage characteristics of the pulp, and by the temperatures of the various dies. A minimum dryness of at least 94% (i.e. 6% water or less) is desirable, otherwise the paper plates loose wet strength.

In the following experiments these conditions were used:

Machine Settings: 10 inch plates;

Target dryness: 95–96%; vacuum die: 300° F./1.XH: 385° F./2.XH: 375 F.

Wet End: Pulp supplied by the CHINET Company, 3 pounds/trial run, containing as wet-end chemicals, added in 40 sec intervals to the stirred pulp, in order of addition:

Nalco 7607—cationic retention aid and coagualant (NALCO CHEM.Co.), 8 pounds/ton;

Alkyl-ketene dimer (AKD) Water repellent (HERCULES Corp.), 6 pounds/ton the fluorochemical polymeric size: calculated to give 0.1% F addon;

Nalco 625—anionic coagulant (NALCO CHEM CO.), 1 pound/ton.

Tests: two tests were carried out:

Hot Saline Solution and Hot Oil test:

Procedure:

1. weigh paper plate.
2. pour either 2% saline at 72° C. or Mazola oil at 99° C. onto plate, enough to fully cover surface.
3. after 5 minutes, pour off solution, wipe plate dry with paper towels and reweigh.

4. calculate % absorption and rate visually the degree of penetration (R):

R=0=>50%; 1=25–50%; 2=<25%; 3=none.

Percent absorption is the more accurate measure of water/oil holdout performance.

The finished plates were tested "off machine", i.e. shortly after made and after 24 hours. Plate dryness "off-machine" was determined gravimetrically.

The test results are shown in the following table.

Turpentine Test

According to TAPPI T454 om-94, a preliminary test to determine rates at which oil or grease can be expected to penetrate the paper.

Water and Alcohol Resistance Tests

Cobb Size Test

Water resistance is determined using the Cobb Sizing test, as described in TAPPI T 441 om-90.

IPA Resistance Test

In this test drops of isopropanol—water mixtures are placed on the paper and after 3 minutes the under side of the

| Cpd. of Ex. No. | VDC | % F added | % dryness | Hot Oil Hold-Out | | Hot Water Hold-Out (2% Saline) | | | |
|---|---|---|---|---|---|---|---|---|---|
| | | | | | | off machine | | 24 hrs. | |
| | | | | R | % abs | R | % abs | R | % abs |
| 1 | yes | 0.09 | 96 | 3 | 7 | 2–3 | 15 | 3 | 14 |
| 2 | yes | 0.09 | 96 | 1–3 | 21 | 2–3 | 15 | 3 | 14 |
| 3 | yes | 0.08 | 96 | 1–2 | 20 | 2 | 17 | 3 | 13 |
| 4 | yes | 0.08 | 96 | 1–2 | 23 | 2 | 14 | 3 | 12 |
| 5 | yes | 0.10 | 96 | 0 | 31 | 2 | 20 | 3 | 12 |
| 6 | yes | 0.10 | 96 | 3 | 5 | 2 | 30 | 3 | 11 |
| 7 | yes | 0.12 | 95 | 2–3 | 15 | 2–3 | 14 | 3 | 15 |
| 8 | yes | 0.10 | 96 | 3 | 6 | 1–2 | 42 | 3 | 13 |
| 9 | no | 0.09 | 96 | 0 | 32 | 2 | 16 | 3 | 13 |
| 10 | no | 0.09 | 95 | 0 | 38 | 2 | 13 | 3 | 14 |
| 11 | no | 0.10 | 95 | 0 | 39 | 1 | 22 | 3 | 12 |
| 12 | no | 0.10 | 97 | 0 | 32 | 2 | 21 | 3 | 12 |

The results demonstrate the superior oil hold-out performance of vinylidene chloride-containing copolymers, especially those of examples 1, 6 and 8, versus non-vinylidene chloride-containing copolymers of examples 9–12.

EXAMPLE 14

The following example shows the usefulness of the novel copolymers as external paper sizes.

External Size Application

The neutralized test solutions are added to a 4% aqueous solution of paper makers starch (Stayco M, oxidized starch, from Staley Corp.) and then applied to unsized paper by padding (paper dipped through starch solution, and passed through single nip rollers). The resulting sheets are dried at ambient conditions for 15 minutes, then 3 minutes at 200° F. (97° C.) in an "Emerson Speed Drier" (heated metal plate with canvas cover).

Oil and Grease Resistance Tests

Oil Kit Test

The oil repellency of the surface is determined by using the TAPPI UM 557 OIL KIT TEST, which consists of determining with which of twelve castor oil-heptane-toluene mixtures having decreasing surface tension penetration occurs within 15 seconds; ratings go from 1, lowest, up to 12.

Ralston-Purina (RP2) Test

Grease resistance is determined with the Ralston-Purina test for pet food materials; RP-2 Test, Ralston-Purina Company, Packaging Reference Manual Volume 06, Test Methods. In summary: cross-wise creased test papers are placed over a grid sheet imprinted with 100 squares. Five grams of sand are placed in the center of the crease. A mixture of synthetic oil and a dye for visualization is pipetted onto the sand and the samples are maintained at 60° C. for 24 hours. Ratings are determined by the percentage of stained grid segments, using at least two samples.

paper is monitored for penetration; if no penetration has occurred, a mixture with the next higher IPA content is applied. The rating is based on the highest % by weight IPA which does not penetrate. Ratings are based on 5% IPA increments.

Pet Food—"Felix" Test

This is a very stringent test, carried out under conditions of high humidity and heat. French "Felix" brand cat food is placed as a 2 cm thick layer on 100 cm². of the treated paper; this sample is then put under a weight of 7 kg and kept in an environmental chamber at 70° C. and 67% moisture for 16 hours. The paper is then visually inspected for signs of fat penetration and the area percent of penetration is calculated. The results are shown in the following table.

| Cpd. of Ex. No. | VDC | % F | Oil Kit | RP-2 | Turpentine Test | Cobb Size Test | IPA Hold-out Test | Felix Test Area % |
|---|---|---|---|---|---|---|---|---|
| 1 | yes | 0.09 | 10 | 4 × 0 | 1800+ | 23 | 40 | 15 |
| 6 | yes | 0.09 | 10 | 4 × 0 | 1800+ | 24 | 40 | 20 |
| 5 | yes | 0.11 | 12 | 4 × 0 | 1800+ | 20 | 40 | 16 |
| 9 | no | 0.10 | 12 | 4 × 0 | 1800+ | 23 | 40 | 21 |
| 12 | no | 0.12 | 12 | 4 × 0 | 1800+ | 21 | 40 | 17 |
| P-514[1] | no | 0.12 | 12 | 4 × 0 | 1800+ | 22 | 40 | 12 |
| P-208[2] | n.a. | 0.10 | | 4 × 0 | | | | 80 |
| FC-845[3] | no | 0.10 | | | | | | |

[1]) Lodyne P-514, is a commercial polymeric fluorinated paper size available from Ciba Specialty Chemicals Corp.
[2]) Lodyne P-208E is a commercial phosphate ester fluorinated paper size from Ciba Specialty Chemicals Corp.
[3]) Scotchguard FC-845 is a commercial polymeric fluorinated paper size from 3M Corp.

The following examples demonstrate the usefulness of the novel polymers as soil-release, anti soil-redeposition and anti dry-soiling agents on textiles.

EXAMPLE 15

Application

A 20×35 cm piece of fabric is treated with a pad-bath containing the following:
- 5.4 g/l fluorine of the fluorochemical copolymer solution of example 1;
- 40 g/l melamine-formaldehyde cellulose crosslinker,
- 12 g/l magnesium chloride as catalyst, and 1 g/l acetic acid.

The pick-up is adjusted to 100% by weight of fabric. The cloth is stretched across a nail-frame and dried at 110° C. for 10 minutes in an oven; then subsequently cured at 150° C. for 5 minutes.

Stain Release Test

The test measures the release of stains after a household wash: 2–3 cm diameter staining material is applied to the fabric and is removed after 30 minutes with cotton swabs. After 20–24 hours the fabric is washed once at 60° C. and the soil release effect evaluated(=original); the fabric is then washed five or ten times respectively and the soiling test is repeated(=5×60° C. or 10×60° C.). The soil-release effect is judged after drying and ironing according to the Soil-Release Standard (DMRC of AATCC). In the example the values given are the average of 14 common stains. Higher values denote better performance.

Wet-Soiling

This test measures the degree of graying during washing in comparison with untreated fabric. Soiling standard: 0.3 g Diphasol 7568 surfactant are dissolved in 1 l hot water, 0.5 g carbon black are added and the mixture brought to a short boil. Then 100 ml of this mixture are added to 1 l water and 5×5 cm fabric swatches are immersed for 20 minutes at 80° C. for cotton, and cotton/polyester, and at 40° C. for polyester.

After a quick rinse the soiled samples are washed with 3 g/l wash powder at 60° C. for cotton and cotton/polyester, and at 40° C. for polyester.

Evaluation is after drying, visually in comparison with untreated fabric. Higher values denote better performance.

Dry-Soiling

In a 30 cm long cylinder with 15 cm diameter equal parts of 5×5 cm fabric swatches, standard dry soil and 5 mm diameter metal balls are tumbled for 20 minutes: then tumbled with new balls and without soil for another 5 minutes. Evaluation is visual using an AATCC gray scale, with rating from 1 (worst) to 5 (best, no change).

Initial Oil Repellency is determined according to AATCC 118; Water Repellency is determined according to AATCC 22.

The test fabrics are 100% cotton tablecloth(=CO woven) and 65/35 cotton/polyester work ware(=CO/PE woven); 100% cotton knit(=CO knit) and 65/35 cotton/polyester knit(=CO/PE knit); the tested compound is of Example 1; the commercial Soil-Release agent Scotchguard FC-248 (3M Company) is used as a standard for comparison.

TABLE

Results of Soil Release Test

| 60° C. washes, | FC-248 | | | Cpd. of Ex. 1 | | | control |
|---|---|---|---|---|---|---|---|
| Fabric | none | 5 | 10 | none | 5 | 10 | 1 |
| CO weave | 3.8 | 3.5 | 3.5 | 3.8 | 3.7 | 3.6 | 2.4 |
| CO knit | 4.5 | 4.1 | 3.9 | 4.4 | 3.8 | 3.7 | 2.4 |
| CO/PE weave | 4.3 | 5.0 | 3.8 | 3.9 | 3.2 | 3.4 | 2.4 |
| CO/PE knit | 4.1 | 3.4 | 3.3 | 3.9 | 3.6 | 3.1 | 2.2 |

TABLE

Results of Oil and Water Repellency Tests

| | FC-248 | | | | Cpd. of Ex. 1 | | | |
|---|---|---|---|---|---|---|---|---|
| TEST 60° C. washes, | Water spray | oil | Water Drop Test | | Water spray | oil | Water Drop Test | |
| fabric | 1 | 1 | 1 5 | 10 | 1 | 1 | 1 5 | 10 |
| CO weave | 50 | 5 | 8 0 | 0 | 50 | 6 | 4 5 | 4 |
| CO knit | 70 | 5 | 4 0 | 0 | 80 | 6 | 4 0 | 0 |
| CO/PE weave | 50 | 6 | 5 5 | 5 | 50 | 6 | 3 4 | 3 |
| CO/PE knit | 50 | 6 | 8 7 | 5 | 70 | 6 | 3 4 | 3 |

TABLE

Results of Wet Soil Redeposition and of Dry-Soiling Test.

| | wet soil redeposition | | | dry soiling | | |
|---|---|---|---|---|---|---|
| Compound Fabric | FC-248 | Cpd. of Ex. 1 | Cont. | FC-248 | Cpd. of Ex. 1 | Cont. |
| CO weave | 4.5 | 4 | 3 | 3 | 4 | 1.5 |
| CO knit | 3.5 | 3.5 | 2.5 | 3.5 | 4 | 1.5 |
| CO/PE weave | 4 | 3.5 | 4 | 3 | 3.5 | 1 |
| CO/PE knit | 3.5 | 3 | 2 | 3 | 3.5 | 1 |

What is claimed is:

1. A copolymer of
   a) 70–85% by weight of a perfluoroalkyl-substituted (meth)acrylate or (meth)acrylamide,
   b) 3–14% by weight of a secondary or tertiary amino or quaternary ammonium group-containing (meth) acrylate or (meth)acrylamide,
   c) 5–20% by weight of vinylidene chloride, and, optionally,
   d) 0–10% by weight of a copolymerizable nonfluorinated vinyl monomer other than glycidyl methacrylate.

2. A copolymer according to claim 1, comprising monomers copolymerized in the following percentages by weight, relative to the total weight of the copolymer:
   a) 70–85% by weight of a monomer of formula $$R_F\text{—}W\text{—}X\text{—}C(\!=\!O)\text{—}C(R_1)\!=\!CH_2 \qquad (1),$$

wherein
   $R_F$ is a straight or branched-chain perfluoroalkyl group containing 4 to 20 carbon atoms,
   $R_1$ is H or $CH_3$,
   X is O, S or $N(R_2)$, wherein $R_2$ is H or an alkyl group with 1 to 4 carbon atoms,
   X is O, S or $N(R_2)$, wherein $R_2$ is H or an alkyl group with 1 to 4 carbon atoms,
   W is alkylene with 1 to 15 carbon atoms, hydroxyalkylene with 3 to 15 carbon atoms,
   —$(C_nH_{2n})(O\ C_mH_{2m})_q$—, —$SO_2NR_2$—$(C_nH_{2n})$— or —$CONR_2$—$(C_nH_{2n})$—, wherein n is 1 to 12, m is 2 to 4, q is 1 to 10 and $R_2$ is as defined above;
   b) 3–14% by weight of a monomer of formula $$(R_2)_2N\text{—}(CH_2)_k\text{—}X_1\text{—}C(\!=\!O)\text{—}C(R_1)\!=\!CH_2 \qquad (2),$$

in which
   the nitrogen atom is partially or completely quaternized or in the form of a salt and
   $X_1$ is O or $N(R_2)$ and wherein
   $R_1$ and $R_2$ are defined as above, each $R_2$ is the same or different, and
   k is 2 to 4;

c) 5–20% by weight of vinylidene chloride, and, optionally, d) 0–10% by weight of a copolymerizable nonfluorinated vinyl monomer.

3. A copolymer according to claim 1, wherein d) is zero.

4. A copolymer according to claim 2, wherein $R_F$ is a straight chain perfluoroalkyl group with 6–16 carbon atoms, X and $X_1$ are oxygen and W is an alkylene with 1 to 12 carbon atoms.

5. A copolymer according to claim 4, wherein $R_1$ is hydrogen and W is —$CH_2CH_2$—.

6. A copolymer according to claim 2, wherein $R_F$ is a straight chain perfluoroalkyl group with 6–16 carbon atoms, X is $N(R_2)$, $X_1$ is oxygen and W is —$SO_2NR_2$—$(C_nH_{2n})$—.

7. A copolymer according to claim 2, wherein $R_F$ comprises a mixture of straight chain perfluoroalkyl groups with 6–16 carbon atoms.

8. A copolymer according to claim 2, in which the monomer of the formula (2) is selected from the group consisting of N,N-dimethylaminoethyl (meth)acrylate; N,N-diethylaminoethyl (meth)acrylate; N,N-dimethylaminopropyl methacrylamide and N-tert.butylaminoethyl methacrylate and their salts.

9. A copolymer according to claim 2, in which co-monomer (d) is selected from the group consisting of acrylates, methacrylates and styrene.

10. A copolymer according to claim 2, in which co-monomer (d) is selected from the group consisting of methyl methacrylate, N-methylol acrylamide, 2-hydroxyethyl methacrylate, acrylic acid and acrylonitrile.

11. A process for the preparation of copolymer according to claim 1, comprising reacting a) 70–85% by weight of a perfluoroalkyl-substituted (meth)acrylate or (meth)acrylamide, b) 3–14% by weight of a secondary or tertiary amino or quaternary ammonium group-containing (meth)acrylate or methacrylamide, c) 5–20% by weight of vinylidene chloride, and, optionally, d) 0–10% by weight of a copolymerizable nonfluorinated vinyl monomer, and, optionally, a chain-transfer agent, in the presence of a free radical initiator.

12. A method to impart soil-release and anti-soiling characteristics to a textile material, which comprises treating the textile material with an amount of a copolymer according to claim 1 that is effective to impart soil-release and anti-soiling characteristics thereto.

13. A method according to claim 12, wherein the textile material is treated with 0.02 to 1% by weight of the copolymer, based on the weight of the dry textile material.

14. Textile material, which comprises 0.02 to 1% by weight of a copolymer according to claim 1.

15. A textile material according to claim 14, which is selected from the group consisting of cellulosics, polyamides, polyesters and polyolefins and blends thereof.

16. A textile material according to claim 15, which is selected from the group consisting of cotton, nylon, wool, silk and polyester-cotton blends.

* * * * *